May 7, 1957 W. J. SPARKS ET AL 2,791,326
PACKAGING TACKY BUTADIENE-STYRENE RUBBER IN FILM
OF COMPATIBLE STYRENE-ISOBUTYLENE COPOLYMER
Filed Dec. 7, 1955
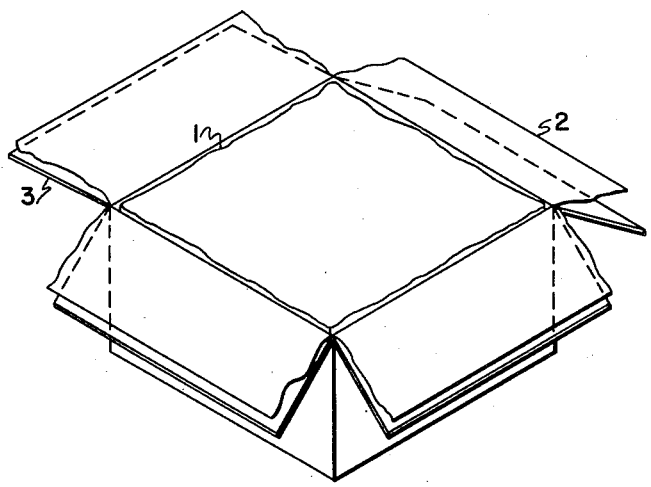
Fig. I
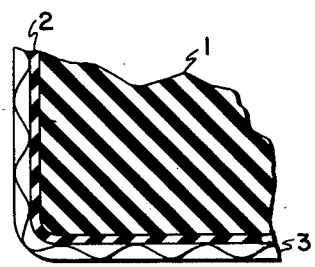
Fig. 2
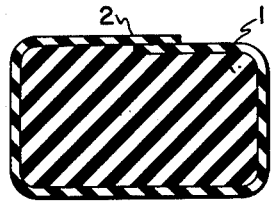
Fig. 3
William J. Sparks
Francis P. Baldwin    Inventors
Raymond G. Newberg
By  E. J. Brenner    Attorney

2,791,326

PACKAGING TACKY BUTADIENE-STYRENE RUBBER IN FILM OF COMPATIBLE STYRENE-ISOBUTYLENE COPOLYMER

William J. Sparks, Westfield, Francis P. Baldwin, Rahway, and Raymond G. Newberg, Roselle Park, N. J., assignors to Esso Research and Engineering Company, a corporation of Delaware Application December 7, 1955, Serial No. 551,594

5 Claims. (Cl. 206—84)

This invention relates to a new article of manufacture and methods of making same, and more particularly, it relates to novel and improved methods of packaging plastic materials which are tacky and have substantial cold-flowing tendencies. One particularly important application of the invention is in packaging tacky butadiene-styrene synthetic rubber in films of a copolymer of styrene and isobutylene. The butadiene-styrene copolymers are of the type manufactured under war emergency contracts under the identification GRS.

The present application is a continuation-in-part of application Serial No. 250,688, filed October 10, 1951, which in turn is a continuation-in-part of application Serial No. 584,622, filed March 24, 1945, now U. S. Patent 2,572,959.

Although the details of the preparation of copolymers of butadiene and styrene do not constitute a part of this invention, it may be noted for the sake of general reference that these copolymers are generally prepared in an emulsion polymerization process. More particularly, an aqueous emulsion of the two monomers is initially formed using a small amount of a fatty acid soap or high molecular weight aliphatic sulfonate as an emulsifier. A catalyst capable of liberating active oxygen, such as a peroxide or persulfate, and a reaction promoter and generally a polymerization modifier are then added and the emulsion is maintained at a temperature of about 25–50° C., usually until say about 75% of the monomers have been converted to a rubber-like polymeric material. The polymer product is obtained in the form of a latex to which is added a polymerization inhibitor and then the copolymer is separated from the latex by addition of a coagulating agent such as sodium chloride. The rubber is separated from the aqueous phase by filtration, washed with water and dried.

Copolymers of butadiene and styrene prepared as described above generally contain about 50 to 80% (e. g., 60 to 75%) of butadiene and about 50 to 20% (e. g., 40 to 25%) of styrene by weight and have Mooney numbers in the range of about 5 to 80 or higher. These butadiene-styrene copolymers are of the type known by the names of "GRS" and "Buna-S" synthetic rubbers.

The synthetic rubber described above is unsaturated and is convertible with sulfur or other suitable vulcanizing or curing agent into a product of decreased plasticity, increased elasticity and tensile strength. In the cured or vulcanized condition, this synthetic rubber has no undesirable tacky or cold-flowing properties, but a serious problem is presented to the rubber industry by the necessity of packaging the raw (i. e., unvulcanized) rubber for shipment from the manufacturing plant to the factories where the raw synthetic rubber is to be compounded with curing agents and other materials as desired, shaped into the desired articles such as inner tubes for tires for autos, airplanes, etc., and then vulcanized.

Because of the tackiness of this raw synthetic rubber stock, it sticks to any of the conventional packaging materials such as paper bags, cardboard boxes or metal containers, in fact so tightly that its removal from such containers requires very time-consuming, drastic procedures. This tackiness problem is particularly serious with raw synthetic rubber of the type described having a Mooney number between approximate limits of 10 to 60. The Mooney test is applied by heating the plastic material in question to 100° C., subjecting it to pressure and measuring the resistance to flow or deformation, the higher the Mooney number, the tougher the material. It should be noted that the GRS specification calls for a Mooney number of 45 to 50.

One object of the present invention is to package this synthetic rubber with a film of wrapping material which will prevent the tacky material from sticking to the paper or metal container in which it is stored or shipped. Another object of the invention is to provide a packaging material which is physically and chemically compatible with the synthetic rubber so that after storage and shipment, or at any desired time, the wrapper film which is used to prevent the tacky material from sticking to the outer container may be homogeneously mixed into the synthetic rubber without deleteriously affecting the desirable properties of the latter. These and other objects and advantages of the invention will be apparent to those skilled in the art from the following specification, particularly when read in conjunction with the accompanying drawing.

Broadly, the invention comprises wrapping the unvulcanized synthetic rubber in a thin, flexible, continuous, self-sustaining sheet or film of a substance capable of forming a homogeneous mixture therewith.

One suitable wrapping material is a synthetic copolymer of an aliphatic olefin such as isobutylene and a polymerizable cyclic compound such as styrene.

A general method of preparing such copolymers is described in U. S. Patent 2,274,749, and this consists in copolymerizing the reactants at a temperature below 0° C. in the presence of an active halide polymerization catalyst such as boron fluoride or aluminum chloride, with or without the use of a diluent-refrigerant such as liquid propane, etc., and using proportions of reactants which may vary over a broad range according to desired hardness, melting point, plasticity, etc. However, for the particular purposes of the present invention, this copolymer must be prepared under certain relatively narrow conditions. The proportion of aliphatic olefin such as isobutylene used in the copolymerization should be about 40 to 70% by weight, preferably about 45 to 60% by weight, while the proportion of polymerizable cyclic compound such as styrene, should be about 35 to 60%, preferably about 40 to 55% by weight, and best results are obtained with even the still narrower range of 45 to 50% by weight.

The copolymerization should be carried out at a temperature below −50° C., preferably below −80° C., such low temperatures being obtained by either internal or external refrigeration.

By thus restricting the proportions of reactants and the copolymerization temperature, high molecular weight copolymers are obtained which have an intrinsic viscosity above 0.5 and preferably 0.8 or 0.9 or higher. These copolymers are thermoplastic solids which have sufficient flexibility and toughness particularly in the heat-softened condition, to permit ready rolling out into thin sheets or films on suitable equipment such as the conventional calender used in rubber processing.

The copolymerization is effected by mixing the two reactants, with or without a mutual solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex—

$$(AlCl_3.Al[OC_2H_5]_3)$$

and the like. If desired, such catalyst may be dissolved in a solvent such as carbon disulfide, a low molecular weight sulfur-free saturated hydrocarbon, a lower alkyl halide, e. g., methyl chloride or ethyl chloride or a mixture of methyl chloride with butane, at or below the boiling point of the catalyst solvent, and then the catalyst solution cooled down, filtered and added to the reaction mixture. Alternative catalysts include:

$$AlCl_3.AlCl_2OH, \quad AlBr_3.AlBr_2OH$$
$$AlBr_2Cl.AlOCl, \quad AlBrCl_2.AlOBr$$
$$TiCl_4AlCl_2OH, \quad TiOCl_2.TiCl_4, \quad AlBr_3.Br_2.CS_2$$

$AlBr_3$, $BF_3$.isopropyl alcohol, $BF_3$ solution in ethylene, activated $BF_3$ catalyst in ethylene solution, activated $BF_3$ catalyst in methyl chloride solution. Volatile solvents or diluents, e. g., propane, ethane, ethylene, methyl chloride, carbon dioxide (liquid or solid), etc. may also serve as internal or external refrigerants to carry off the liberated heat of polymerization. After completion of the copolymerization, residual catalyst is killed with alcohol, for example, isopropyl and excess catalyst removed by washing the product with water and preferably also with dilute aqueous caustic soda. The resulting solid copolymer may range from a relatively stiff plastic mass to a hard tough thermoplastic solid, depending upon the temperature of polymerization, the yield of polymer obtained upon the active feed, the type and concentration of catalyst, the proportion of cyclic reactant in the feed, and the temperature at which the physical texture is observed.

The proportions in which the reactants, e. g., styrene and isobutylene, have actually combined during copolymerization may be determined by interpolation of a carbon-hydrogen analysis between the limits, for instance:

|  | Carbon, Percent | Hydrogen, Percent |
| --- | --- | --- |
| Pure styrene | 92.3 | 7.7 |
| Pure isobutylene | 85.7 | 14.3 |

For convenience and brevity the above-described copolymer of a cyclic polymerizable material and an olefin or alkene will be referred to as a cycalkene copolymer, or more simply a cycalkene. The specific type of copolymer made from styrene and isobutylene will similarly be referred to as simply stybutene. The invention will be illustrated as applied particularly to stybutene, although it is not to be limited specifically thereto.

Many resinous and plastic materials either occurring in nature or made synthetically heretofore are unsuitable for sheeting out into thin self-supporting films because they are either too brittle or have too much cold flow, etc., and furthermore, most of the plastics which can be successfully sheeted out into thin self-supporting films are unsatisfactory for the purpose of the present invention, either because they are not physically and chemically compatible with the synthetic rubber type of plastic intended to be wrapped, and therefore, could not be homogeneously milled into such material, or else because they themselves have too much cold flow and tackiness.

For preparing self-supporting films of stybutene for use as a wrapper according to this invention, the stybutene, having a high intrinsic viscosity as mentioned above, should be heated well above the softening point, for instance, to a temperature of about 100–180° C., preferably in a kneader type mixer to bring the entire mass to a uniform temperature and plasticity, and then it is sheeted out into a thin film by processing on a rubber calender. In this latter operation a three roll calender may be employed. The center roll is heated to about 220° F.; the top roll is maintained at a temperature between 250° and 300° F. The bottom roll is maintained at a temperature of about 80° F. The film is stripped from the middle roll and allowed to cool on the bottom roll then subsequently rolled automatically on a mandrel. The sheet may then be slit or cut to size depending on the application requirements.

In preparing the stybutene film, one may add small amounts of other materials to the plastic mass before sheeting it out into film form, as for instance, small amounts of soluble coloring agents such as blue, red, yellow, green, or other colored dyes, preferably of the oil-soluble type, colorless, light absorbing substances such as quinine, aesculin, etc. to protect the synthetic rubber or plastic wrapped in the film from the harmful effect of sunlight, ultraviolet light, etc., during storage or shipment, or pigments or other powdered fillers may be added. Small amounts of plasticizers or calendering aids may be used, or other resinous or plastic materials which may be used to slightly modify the physical characteristics of the stybutene film without greatly affecting the chemical properties thereof or without adversely affecting its compatibility with the synthetic rubber or other plastic intended to be wrapped therein. Examples of such various additives, which may be used in proportions of 1 to 5% or more, include high molecular weight polybutene (preferably 30,000 to 300,000 molecular weight Staudinger), isobutylene-polyolefin low-temperature copolymers (preferably 30,000 to 150,000 molecular weight Staudinger), isobutylene - polyolefin - styrene tripolymers (preferably 10,000 to 100,000 molecular weight Staudinger), high molecular weight sulfurized alkylated phenol $$[HO(R)C_6H_3]_2S$$

paraffin wax, high melting point deoiled petrolatum, vegetable waxes, stearic acid, high molecular weight polymethylpentadiene (30,000 to 40,000 molecular weight Staudinger), high molecular weight polyethylene, deproteinized and deashed or cyclized rubber, cyclized rubber, and aliphatic nitriles that contain 12 to 18 carbon atoms, zinc stearate, zinc oxide, sodium stearate, carbon black, etc.

After sheeting out the stybutene into a thin film by rolling, calendering, or any other suitable method, the resulting film which may be prepared in any desired thickness, but for the present invention preferably has a thickness of about .001 inch to .01 inch, or about 1 to 10 mils, and preferably about 2 to 4 mils is found to have a smooth surface, good strength, good flexibility, low permeability to moisture vapor and other gases, low cold flow and little or no surface tack.

In carrying out the invention, it is found that the actual amount of stybutene film necessary for wrapping the raw synthetic rubber having cold-flowing tendencies, is relatively very small, ranging for instance, from about 1 to 25 pounds, preferably about 2 to 10 pounds per ton of synthetic rubber, the latter preferably being packaged in chunks weighing about 25 to 100 pounds, preferably about 50 pounds each. If chunks of raw synthetic rubber weighing about 50 pounds each are wrapped with a stybutene film having a thickness of about 2 mils, the total amount of stybutene required for the wrapping will be about 4 pounds per ton of rubber, which amounts to about 0.2% of stybutene by weight. Thinner films can be used with smaller weights of synthetic rubber, and conversely thicker films should be used with relatively larger packages of synthetic rubber or other plastic.

Although for some purposes such as short time storage and transportation over short distances or requiring only a short time, the plastic having cold-flowing tendencies and wrapped up in the thin film of stybutene or other cycalkene copolymer having requisite tensile strength, toughness and non-tackiness, may be used as such, i. e., without being placed in any outer container or wrapped in outer wrapping material, it is preferred to use an outer container such as a corrugated paper carton, paper or cloth bag, large tin cans, drums, etc., or for some purposes where the packages are less subject to mechanical injury from bumping solid objects, etc., it may be sufficient to cover the stybutene-wrapped synthetic rubber with ordinary heavy wrapping paper, such as the kraft paper commonly used for wrapping purposes, such wrapping being chiefly for the purpose of keeping the inner package clean.

The invention is illustrated in the accompanying drawing in which Figure 1 represents a perspective view of an open corrugated paper carton containing a large chunk of raw synthetic rubber of the butadiene-styrene type wrapped, except for the open top, in a thin sheet or film of stybutene copolymer, the Figure 2 shows an enlarged section of one of the lower corners of the package shown in Figure 1, and Figure 3 is a cross section of a package of the synthetic rubber merely wrapped in a thin film of stybutene without any outer container or wrapper. In the several figures, like reference numerals represent like parts.

Referring to Figure 1 of the drawing, a large piece or chunk of tacky plastic 1, i. e., raw synthetic rubber of the GRS type is shown as wrapped in a thin film of cycalkene copolymer 2, the top of the package being illustrated open for convenient understanding of the invention, the wrapped tacky plastic being shown as placed in an outer container 3 such as a corrugated paper carton, also shown open to permit seeing the contents thereof. It is understood, of course, that for storage and shipment, the upper flaps of the wrapper 2 will be folded down over the surface of the plastic 1, and then the lids of the carton 3 will be closed in the conventional manner.

In Figure 2, which represents a much enlarged vertical section through one of the lower corners of the package shown in Figure 1, the plastic 1 is shown as tightly pressing against the sourrounding thin film or sheet of cycalkene copolymer 2, which in turn presses tightly on the bottom of the outer container 3, e. g., a corrugated carton. The plastic 1 and surrounding wrapper 2 may or may not press tightly against the side walls and in the bottom corners of the container 3 when first packaged, although during storage and during shipment when the package is subjected to substantial vibration, the plastic 1 tends to flow into the bottom corners and against the side walls of the container 3, thereby stretching the thin, tough, but slightly elastic film 2. However, it is found that even after shipment or after substantial storage, when the container 3 is opened for removing its contents, the plastic 1 surrounded by its wrapper 2 will not substantially adhere to the inner surface of the container 3, and can readily be removed without difficulty and in a clean condition.

Figure 3 is a vertical section of a package similar to that shown in Figure 1 except that the plastic 1 is shown merely wrapped in a thin film of a cycalkene copolymer 2 without any outer container such as shown in Figures 1 and 2.

The advantages of the invention will be better understood from a consideration of the following specific examples.

*Example I*

Small bales of cold rubber GRS (2" x 4" x 1") were wrapped in 2 mil films of "Parapol S–50" and "Parapol S–60." The bales were then assembled three in a cardboard carton (the S–50 wrapped bales in one carton, the S–60 protected bales in another, and a control where no plastic film coating was used). The cartons were then placed in an oven maintained at 140° F. The cartons were subjected to a dead weight load of one lb./sq. in. They were maintained in this condition for 12 days—then removed from the oven and examined for sticking and failures. The control was found to be stuck to the cardboard carton so tightly that it could not be removed. Those bales protected with S–50 and S–60 film were easily removed from the cartons and there was no evidence of sticking. To test compatibility, the film-protected bales were placed on a rubber mill and milled for 5 minutes. It was found that in both cases as soon as the stock reached the softening point of the plastic film (between 60 and 80° C.) the film was readily assimilated by the rubber and was completely compatible. The rubble could further be compounded with such common ingredients as carbon blacks, and the normal vulcanizing agents and the final product suffered no ill effects from the presence of the small amount of "Parapol–S." The "Parapol S–60" was a stybutene having a combined styrene content of about 60%, and an intrinsic viscosity of about 0.75, which had been made by copolymerizing styrene and isobutylene at −103° C., using as catalyst a 0.5% by weight solution of AlCl$_3$ in methyl chloride, and using 3 volumes of CH$_3$Cl as diluent per volume of mixed reactants. The "Parapol S–50" was a stybutene having a combined styrene content of 50% and prepared under substantially identical copolymerization conditions.

*Example II*

In order to simulate actual packaging conditions in a GR–S plant a second series of experiments were run. Small bales of GR–S (2" x 4" x 1") were heated to 160° F. and were wrapped while hot in 2 mil films of "Parapol S–50" and S–60. These bales were then assembled in a cardboard carton (the S–50 wrapped bales in one carton, the S–60 wrapped bales in another, and a control carton where the bales were unwrapped). The cartons were then placed in an oven at 160° F. and loaded to 1.5 lb./sq. in. The temperature in the oven was lowered 10° each day until after seven days it reached 100° F. The packages were then removed from the oven and allowed to cool to room temperatures and examined. The control sample was struck tightly to the carton and could not be removed. Those bales protected with S–50 and S–60 film were easily removed from the carton with no evidence of sticking.

Instead of actually wrapping the raw synthetic rubber in the stybutene and then placing the resulting package in an outer cardboard, paper, cloth, wood or metal container, the stybutene film can first be placed in the empty container and then the cold-flowing plastic can be inserted.

Although it is preferred to use films, it is possible to apply the coating to the plastic material to be packaged, in other ways. This is especially true when the plastic packaged is in the form of a bale or block which is the shape of the package to be used. Alternate methods of applying the exterior coating include application of a solution of the stybutene by spraying, brushing or dipping followed by an evaporation of the solvent. Instead of a solution of the stybutene an aqueous dispersion thereof can be used and applied in a like manner. When using solution or aqueous dispersion, fillers may also be used such as zinc stearate, carbon black, etc.

It is not intended that this invention be limited to the specific examples or modifications which have been described merely for the sake of illustration, but only by the appended claims in which it is intended to claim all novelty inherent in the invention, as well as all modifications coming within the scope and spirit of the invention.

What is claimed is:

1. The method of packaging a butadiene-styrene copolymer having tacky, cold-flowing characteristics, which comprises wrapping it in a thin, flexible, continuous, self-sustaining film of a styrene-isobutylene copolymer.

2. The method of packaging a raw synthetic rubber of the butadiene-styrene type having a Mooney number of about 10 to 60, which comprises wrapping it in a thin, continuous self-sustaining film of a styrene-isobutylene copolymer having an intrinsic viscosity greater than 0.5 and having a combined styrene content of about 40 to 60% by weight, and placing the synthetic rubber wrapped with styrene-isobutylene copolymer in a paper carton for shipment or storage.

3. A package comprising a substantially rigid container, substantially filled with unvulcanized rubber of the butadiene-styrene type having a Mooney number of about 10 to 60, said synthetic rubber being separated from said container by a thin film of about 1 to 10 mils in thickness of a styrene-isobutylene copolymer having an intrinsic viscosity greater than 0.5 and having a combined styrene content of about 40 to 60% by weight.

4. A package comprising a bag made of fibrous sheet material containing therein a substantial volume of an unvulcanized synthetic rubber of the butadiene-styrene type having a Mooney number of about 10 to 60, said synthetic rubber being separated from said bag by a thin film of about 1 to 10 mils in thickness of a styrene-isobutylene copolymer having an intrinsic viscosity greater than 0.5 and having a combined styrene content of about 40 to 60% by weight.

5. A package comprising unvulcanized synthetic rubber of the butadiene-styrene type having a Mooney number of about 10 to 60, wrapped in a film of about 1 to 10 mils in thickness of a styrene-isobutylene copolymer having an intrinsic viscosity greater than 0.5 and having a combined styrene content of about 40 to 60% by weight.

No references cited.